United States Patent
Cho et al.

(10) Patent No.: US 8,300,746 B2
(45) Date of Patent: Oct. 30, 2012

(54) METHOD AND DEVICE OF FREQUENCY DOMAIN EQUALIZATION

(75) Inventors: Jun Ho Cho, Gyeongsangbuk-do (KR); Young Geon Yoo, Gyeongsangbuk-do (KR)

(73) Assignee: POSTECH Academy-Industry Foundation, Pohang (KR)

( * ) Notice: Subject to any disclaimer, the term of this patent is extended or adjusted under 35 U.S.C. 154(b) by 835 days.

(21) Appl. No.: 12/467,481

(22) Filed: May 18, 2009

(65) Prior Publication Data

US 2010/0124266 A1    May 20, 2010

(30) Foreign Application Priority Data

Nov. 19, 2008   (KR) ......................... 10-2008-0115029

(51) Int. Cl.
*H04B 7/10* (2006.01)
(52) U.S. Cl. ..................... 375/347; 375/350; 455/67.11; 455/296
(58) Field of Classification Search ................. 375/232, 375/340, 346, 347, 350; 708/300, 309, 311, 708/323; 455/501, 63.1, 67.11, 226.1, 296
See application file for complete search history.

(56) References Cited

U.S. PATENT DOCUMENTS

| | | | | |
|---|---|---|---|---|
| 7,031,379 | B2 * | 4/2006 | Sestok et al. | 375/219 |
| 7,852,951 | B2 * | 12/2010 | Kalluri et al. | 375/260 |
| 7,944,810 | B2 * | 5/2011 | Lee et al. | 370/208 |
| 2004/0228392 | A1 * | 11/2004 | Zhang et al. | 375/148 |
| 2006/0008018 | A1 * | 1/2006 | Kolze | 375/260 |
| 2009/0213969 | A1 * | 8/2009 | Hasegawa et al. | 375/343 |

* cited by examiner

*Primary Examiner* — Dac Ha
(74) *Attorney, Agent, or Firm* — Occhiuti Rohlicek & Tsao LLP

(57) ABSTRACT

A method of a frequency-domain equalization to jointly suppress inter-symbol interference (ISI) and data-like co-channel interference (CCI) includes receiving a transmit signal over a channel, generating a vector by sampling and converting the transmit signal to a frequency domain signal; generating an equalized vector by multiplying an equalization matrix to the vector generated by converting; generating an estimate of data vector by inverse converting the equalized vector; and recovering data included in the transmit signal based on the estimate of data vector, wherein the equalization matrix is generated by approximating a frequency domain correlation matrix. Significant computational complexity is reduced than the LMMSE equalization while resulting in almost no performance degradation compared to the LMMSE equalization.

4 Claims, 7 Drawing Sheets

METHOD AND DEVICE OF FREQUENCY DOMAIN EQUALIZATION

CROSS-REFERENCE TO RELATED APPLICATIONS

This application claims the benefit of priority of Korean Patent Application No. 10-2008-0115029 filed on Nov. 19, 2008 which is incorporated by reference in its entirety herein.

FIELD OF THE INVENTION

The invention relates to method and apparatus for equalization in communication system.

BACKGROUND OF THE INVENTION

Recently, there is a tremendous interest in single-carrier (SC) block transmission with cyclic prefix (CP) or unique word (UW) being appended before each data block. Compared to multi-carrier modulation, the SC modulation has lower peak-to-average power ratio and lower sensitivity to carrier frequency offset. Moreover, with CP or UW, such an SC block transmission allows the design of frequency-domain equalizers (FDEs) that can significantly reduce the complexity in suppressing the inter-symbol interference (ISI) caused by the frequency selectivity of the channel. (see D. Falconer, S. L. Ariyavisitakul, A. Benyamin-Seeyar, and B. Eidson, 'Frequency domain equalization for single-carrier broadband wireless systems', IEEE Communications Magazine, vol. 40, no. 4, pp. 27-36, April 2002.)

When applied to cellular communications, an SC modulation system has additional performance-limiting factor of co-channel interference (CCI). To overcome these channel impairments, various joint CCI and ISI suppression schemes have been developed. In A. Ginesi, G. M. Vitetta, and D. D. Falconer, 'Block channel equalization in the presence of a cochannel interferent signal', IEEE Journal on Selected Areas in Communications, vol. 17, no. 11, pp. 1853-1862, November 1999, linear and decision feedback time-domain equalizers (TDEs) are derived in typical cellular systems, where one dominant interferer contributes mainly to the data-like CCI. However, these TDEs in general suffer from high computational complexity, especially in inverting the signal correlation matrix and multiplying the equalization matrix to the observation vector.

To reduce the computational complexity, an FDE may be designed as is the common practice for ISI suppression. However, a direct conversion of the linear minimum mean-squared error (LMMSE) TDE to an FDE does not lead to a significant complexity reduction. This is because the frequency-domain correlation matrix of the CCI plus Gaussian noise component is no longer a diagonal matrix. Thus, the LMMSE FDE still requires the inversion of an un-structured matrix and the matrix-vector multiplication rather than simple one-tap equalization.

To overcome these shortcomings, the correlation matrix may be replaced with an equivalent matrix whose structure can be exploited in the complexity reduction. Such replacement techniques have been frequently used in signal processing and the approximations are justified by the theory of asymptotically equivalent sequences of matrices (see R. M. Gray, 'Toeplitz and circulant matrices: a review', Information theory laboratory, Stanford univ., Stanford, Calif.). Among various asymptotic equivalences, the equivalence between the sequence of Toeplitz matrices and that of circulant matrices has been of the foremost interest. However, when the receive filter output is over-sampled to better capture the channel response and the second-order statistics of the data-like CCI, the CCI plus noise correlation matrix is not Toeplitz.

The present invention provides a method and apparatus for frequency domain equalization to jointly suppress ISI and CCI that has much lower computational complexity than the LMMSE equalizers while resulting in almost no performance degradation compared to the LMMSE equalizers. Motivated by the facts that the data-like CCI is, or is well approximated as, a wide-sense cyclostationary (WSCS) random process and that the double Fourier transform of its autocorrelation function consists of impulse fences with equal spacing, a block matrix approximation with diagonal blocks to the frequency-domain correlation matrix is invoked. Since the inversion of such a block matrix can be performed efficiently and the inverse is also a block matrix with diagonal block, the resultant FDE for joint ISI and CCI suppression obtained from the LMMSE FDE through the replacement has much lower computational complexity than the LMMSE equalizers.

SUMMARY OF THE INVENTION

A method and apparatus for frequency domain equalization to jointly suppress ISI and CCI is provided. The computational complexity of the LMMSE equalization is significantly reduced, while the performance of the LMMSE equalization is also asymptotically achieved.

In an aspect of the present invention, a method of frequency-domain equalization to jointly suppress ISI and CCI includes receiving a transmit signal over a channel, generating a vector by sampling and converting the transmit signal to a frequency domain signal, generating an equalized vector by multiplying an equalization matrix to the vector generated by converting, generating an estimate of data vector by inverse converting the equalized vector and recovering data included in the transmit signal based on the estimate of data vector, wherein the equalization matrix is generated by approximating a frequency domain correlation matrix.

In an embodiment, the equalization matrix may be generated by determining a channel matrix $\bar{H}$, determining the frequency domain correlation matrix $\hat{R}$ based on statistical characteristics of the CCI plus noise, and determining an block matrix with diagonal blocks $\hat{\Omega}$ based on the frequency domain correlation matrix $\hat{R}$.

In an another aspect, a frequency-domain equalizer to jointly suppress ISI and CCI includes a communication interface for receiving a transmit signal over a channel, a converter for sampling the received transmit signal and generating a vector by converting the transmit signal, an equalizer for generating an equalization matrix by approximating a frequency domain correlation matrix, and generating an equalized vector by multiplying the equalization matrix to the vector generated by converting, an inverse converter for generating an estimate of data vector by inverse converting the equalized vector and a detector for recovering data included in the transmit signal based on the estimate of data vector.

DESCRIPTION OF EXEMPLARY EMBODIMENTS

Figure 1:
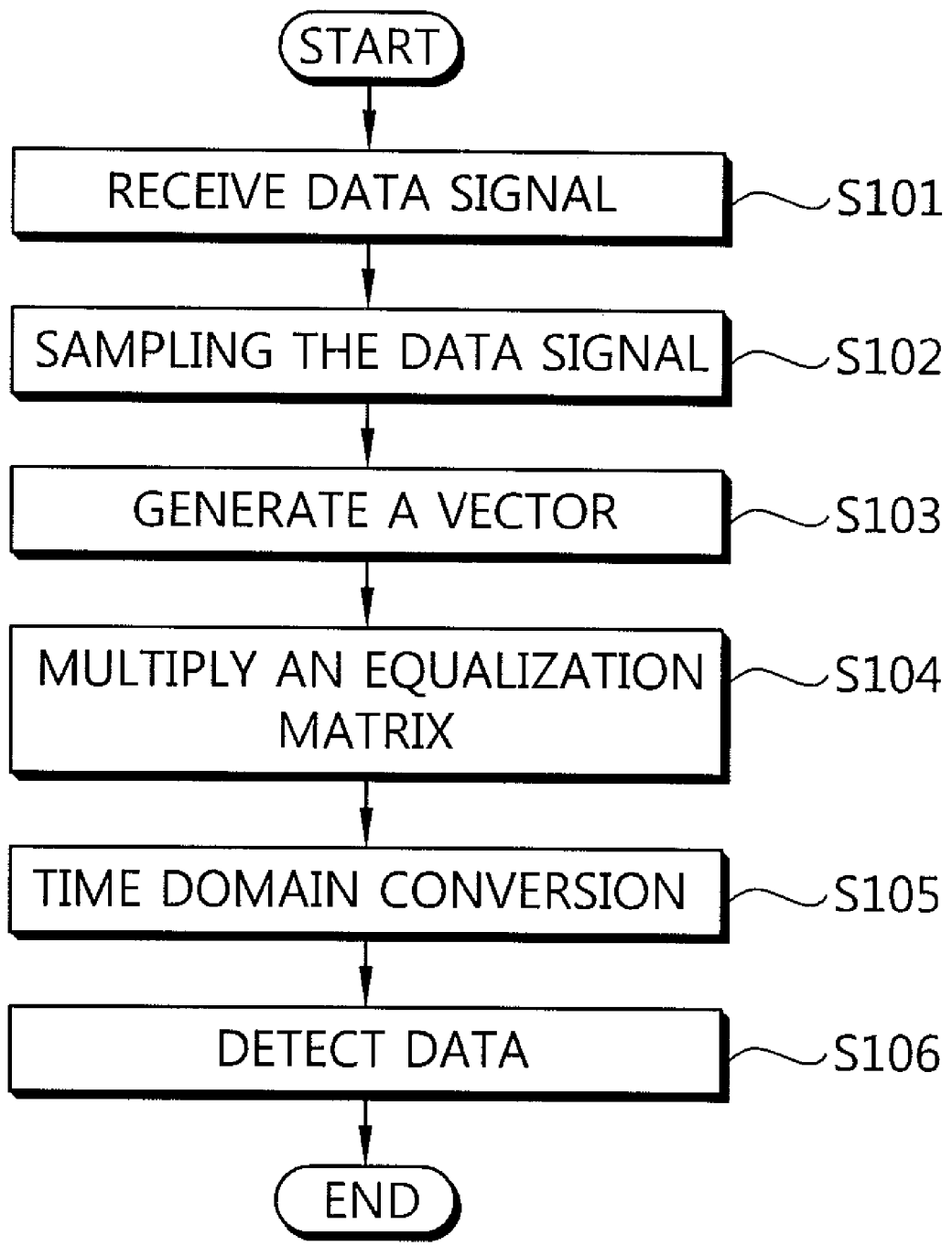
FIG. 1 is a flowchart of a method for frequency domain equalization.

FIG. 1 is a flowchart of the method for frequency domain equalization according an exemplary embodiment of the present invention. The method may be performed by a frequency domain equalizer.

In communication systems, a receiver receives transmitted data from a transmitter for a data recovery, but the ISI caused by the frequency selective channel between the transmitter and receiver limits the performance of the system. An equalization can be performed to reduce the harmful effect of ISI. Among many equalization criteria, the LMMSE criterion is frequently used. The computational complexity of the conventional time domain LMMSE equalization can be significantly reduced by using frequency domain LMMSE equalization. However, in the presence of CCI, the frequency domain LMMSE equalization to jointly suppress ISI and CCI also requires high computational complexity. Thus, what is needed is a low-complexity equalization to jointly suppress ISI and CCI, In S101, the receiver receives the transmit signal from the transmitter. In S102, the receiver obtains samples by sampling the received signal, where the sampling may includes over-sampling. In S103, a frequency domain observation vector is generated after removing CP. The generated observation vector is used in equalization. In S104, an equalization matrix is multiplied to the observation vector. The computational complexity of the equalizer is determined in this process. The LMMSE equalization matrix include a correlation matrix $\hat{R}$. Without the data-like CCI, $\hat{R}$ is a diagonal matrix. However, when there exist data-like CCI, the most of the entries of $\hat{R}$ are not zeros. Thus, the LMMSE frequency domain equalization requires high computational complexity when there exists the CCI. The present invention provides an approximation $\hat{\Omega}$ of $\hat{R}$ which leads to significant complexity reduction in equalization. In S105, the equalized vector is converted to time domain to obtain the estimate of data vector. In S106 data included in the transmit signal is recovered.

Figure 2:
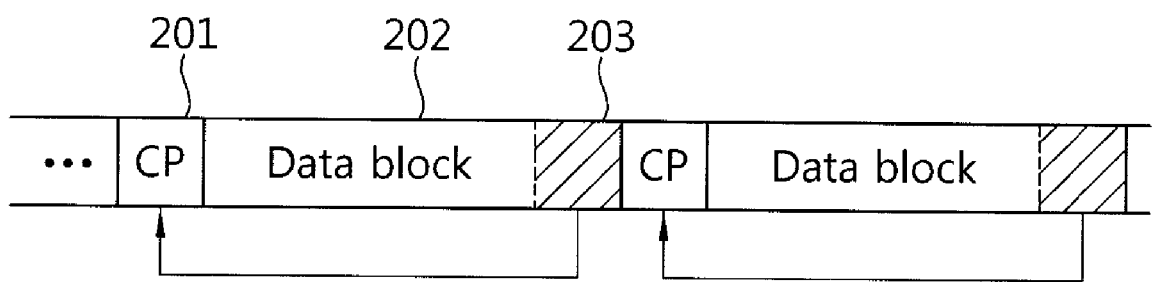
FIG. 2 is a diagram explaining a method of CP insertion.

FIG. 2 is a diagram explaining a method for CP 201 insertion. For an efficient use of the frequency domain equalization, the insertion of CP 201 before every block 202 of data symbols is required. The CP consists of data symbols located in the last part of the block 202.

Figure 3:
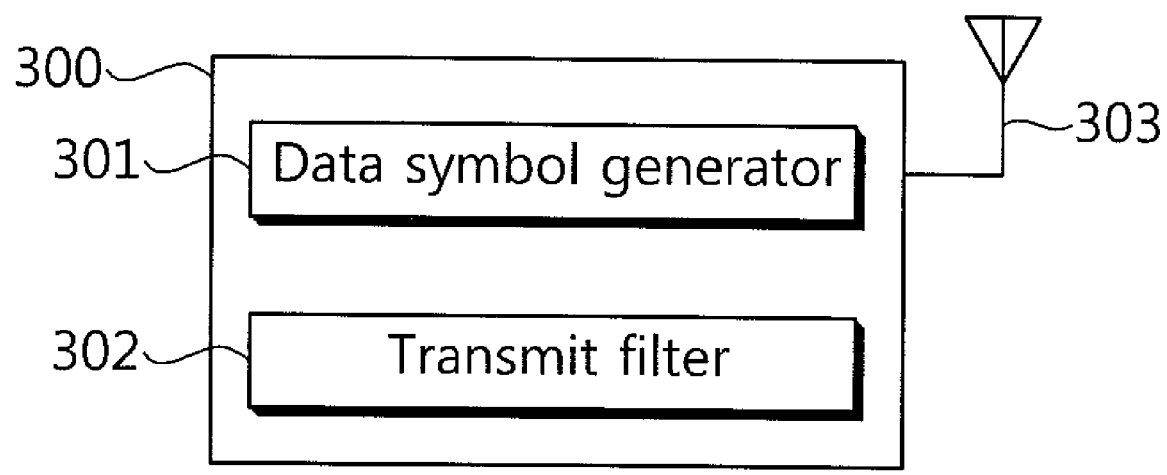
FIG. 3 is a block diagram illustrating an exemplary configuration of the transmitter.
Figure 4:
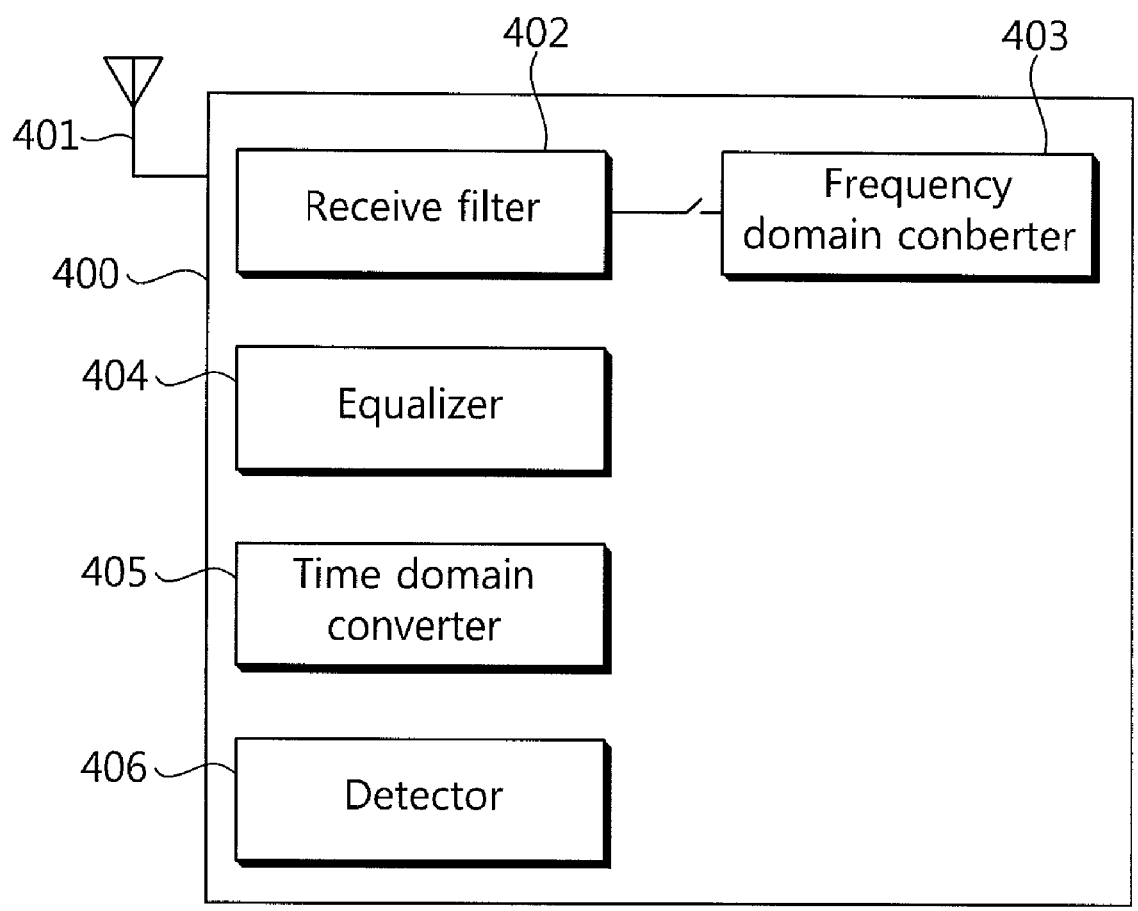
FIG. 4 is a block diagram illustrating an exemplary configuration of the receiver.

FIG. 3 and FIG. 4 is a block diagram of the transmitter 300 and receiver 400, respectively. The transmitter 300 may include information bearing data symbol generator 301, transmit filter 302, and transmit antenna 303. The information bearing data symbols $(b[n])_{n=1}^N$ are modeled as zero-mean uncorrelated random variables with variance $\sigma_b^2$. A length-K CP is appended before every length-N block of data symbols, then the resultant sequence is linearly modulated at the symbol rate of 1/T [symbols/sec].

The transmit signal from the transmitter 300 is filtered by a channel, and received by a receive antenna 401 at the receiver 400 in the presence of data-like CCI and AWGN. The receiver 400 may include a receive antenna 401, a receive filter 402, a frequency domain converter 403, an equalizer 404, a time domain converter 405, and a detector 406. Here, the frequency domain converter may convert a signal to the frequency domain signal or frequency domain vector, and the time domain converter may convert a vector to the time domain vector. Therefore, the time domain converter may be a inverse converter compared to the frequency domain converter. Similarly, according to the embodiments of the present invention, the conversion may mean the frequency domain conversion and the inverse conversion may mean the time domain conversion.

The received signal passes through a receive filter 402 and sampled at the rate of M/T [samples/sec], where the integer M is an over-sampling factor. The impulse response of the receive filter is a square-root Nyquist pulse for the over-sampling rate M/T, so that the AWGN is still white after the sampling. Let h(t) be the impulse response of the overall channel that combines all the effects of the transmit pulse, the channel, and the receive filter. The sampled overall-channel impulse response $(h[n])_n \triangleq (h(nT/M))_n$ has a finite support of L, i.e., h[n] is zero except on the interval $0 \leq n \leq L-1$, where $L-1 \leq KM (\leq MN)$. Therefore, there is no inter block interference and the received signal can be processed in a block by block manner.

Let v(t) be the receive filter 402 output of the CCI plus Gaussian noise component. This component is modeled as a zero-mean WSCS noise with cycle period T, i.e., $$r(t_1,t_2) \triangleq \mathbb{E}\{v(t_1)v(t_2)^*\} = r(t_1+kT, t_2+kT), \forall t_1, t_2 \in \mathbb{R}, \forall k \in \mathbb{Z}. \quad (1)$$

This is the case with the CCI being a linearly modulated wide-sense stationary (WSS) data symbols with the symbol period of T. Since $\mathbb{E}\{v(kT/M)v(lT/M)^*\} = r(kT/M, lT/M)$, the over-sampled version $(v(nT/M))_n$ of v(t) with M>1 becomes a discrete-time WSCS random process with period M. If M=1, then the WSCS feature in v(t) is not well captured by $(v(kT))_k$, which is WSS. Even without CCI, an FDE with M=1 is known to be outperformed by those with M>1. Consequently, the MSE performance becomes poor.

The sampler outputs are first grouped into length-M(K+N) vectors with the first entry of each vector being the first sample in the CP part of the first arriving path. Then, MK samples in the beginning of each vector are removed, and the remaining part of each vector is used in the equalization. Denote this length-MN observation vector as z. Then, z can be written as $$z = H\Psi^{(M)}b + v, \quad (3)$$

where H is the MN×MN overall channel response matrix, which is circulant with the first column given by $[h[0], h[1], \ldots, h[L-1], 0, \ldots, 0]^T$, b is a length-N vector that contains corresponding information bearing symbols, and v is the CCI plus noise component. In (3), $\Psi^{(M)}$ is the MN×N matrix whose (m,n)th entry is given by $$[\Psi^{(M)}]_{m,n} = \begin{cases} 1, & \text{for } m = Mn \\ 0, & \text{elsewhere.} \end{cases} \quad (4)$$

Thus, the product $\Psi^{(M)}b$ inserts M−1 zeros after each entry of b. The indexes of vectors and matrices start from zero.

Let F be the equalization matrix of the LMMSE TDE that minimizes the average MSE $\epsilon^{(N)}$ defined as $$\epsilon^{(N)} \triangleq \frac{1}{N}\mathbb{E}\{|b - Fz|^2\}. \quad (5)$$

Then, the normal equation $\mathbb{E}\{bz^H\}=\mathbb{E}\{zz^H\}$ and the signal model (3) lead to $$F = \sigma_b^2 \Psi^{(M)H} H^H (\sigma_b^2 H \Psi^{(M)} \Psi^{(M)H} H^H + R)^{-1}, \quad (6)$$

where $R \triangleq \mathbb{E}\{vv^H\}$ is the correlation matrix of v. In the derivation of F, the major computational burden is on the inversion of the signal correlation matrix. It is well known that, if a matrix is an MN×MN Hermitian symmetric positive definite Toeplitz matrix, the inversion requires $O(M^2N^2)$ scalar multiplications and that, otherwise, it requires $O(M^pN^p)$ multiplications with p>2. For example, if the Cholesky factorization is used, it requires $O(M^3N^3)$ multiplications. Unfortunately, the matrix to be inverted in (6) is not Toeplitz for M>1.

To reduce the computational complexity, the frequency-domain equalization may be considered. Let $W_N$ be the N×N DFT matrix whose (m,n)th entry is given by $$[W_N]_{m,n} \triangleq \frac{1}{N} W_N^{mn}, \; m, n = 0, 1, \ldots, N-1, \quad (7)$$

where $$W_N^{mn} \triangleq e^{-j2\pi \frac{mn}{N}},$$

and define $\hat{z} \triangleq W_{MN} z$, $\hat{b} = W_{MN} b$ and $\hat{v} \triangleq W_{MN} v$, respectively, as the observation, the data, and the CCI plus noise vectors in the frequency domain. Then, $\hat{z}$ can be written as $$\hat{z} = \overline{H}\hat{b} + \hat{v}, \quad (8)$$

where $\overline{H}$ is the MN×N matrix defined as $$\overline{H} \triangleq W_{MN} H \Psi^{(M)} W_N^H. \quad (9)$$

It can be shown that $\overline{H}$ can be rewritten as $$\overline{H} = \sqrt{N}[\hat{H}^{(0)}, \hat{H}^{(1)}, \ldots, \hat{H}^{(M-1)}]^T, \quad (10)$$

where $\hat{H}^{(k)}$ is the N×N diagonal matrix whose mth diagonal entry is defined as $$[\hat{H}^{(k)}]_{m,m} \triangleq \sqrt{\frac{1}{MN}} \sum_{n=0}^{L-1} h[n] W_{MN}^{(Nk+m)n}. \quad (11)$$

In other words, the diagonal entries of $\hat{H}^{(k)}$ are the elements of the kth length-N block of the MN-point DFT of the sampled overall-channel impulse response $(h[n])_{n=0}^{L-1}$.

Let G be the N×MN matrix satisfying $G \triangleq W_N F W_{MN}^H$. Then, the average MSE (5) can be rewritten as $$\epsilon^{(N)} = \frac{1}{N} \mathbb{E}\{\|\hat{b} - G\hat{z}\|^2\}. \quad (12)$$

Thus, G can be viewed as the LMMSE frequency-domain equalization matrix that minimizes the average MSE between $\hat{b}$ and $G\hat{z}$. By using (6) and (9), we obtain G as $$G = \sigma_b^2 \overline{H}^H (\sigma_b^2 \overline{H} \overline{H}^H + \hat{R})^{-1} \quad (13)$$

where $\hat{R} \triangleq \mathbb{E}\{\hat{v}\hat{v}^H\} = W_{MN} R W_{MN}^H$ is the correlation matrix of $\hat{v}$.

Similar to the LMMSE TDE, this LMMSE FDE suffers from high computational complexity since the equalization procedure requires in general the inversion of a large unstructured matrix. In the special case without CCI but only with ISI, however, the matrix inversion lemma makes the equalization matrix G involve only the inversion of a diagonal matrix and become a block matrix with diagonal blocks. Thus, the multiplication of G to $\hat{z}$ requires only MN scalar multiplications. Since the complexity of the LMMSE FDE designed in the absence of CCI is dominated by that of the fast Fourier transform (FFT) algorithm, the overall computational complexity is much less than those of the LMMSE TDE and FDE designed to jointly suppress ISI and CCI.

In the matrix inversion $(\sigma_b^2 \overline{H}\overline{H}^H + \hat{R})^{-1}$, the first term $\overline{H}\overline{H}^H$ is well structured in that it is a block matrix with diagonal matrix blocks. The second term $\hat{R}$, however, does not appear to have such a structure.

Compare the double Fourier transform $$R(f_1, f_2) \triangleq \sum_{k=-\infty}^{\infty} \sum_{l=-\infty}^{\infty} r\left(\frac{kT}{M}, \frac{lT}{M}\right) e^{-j2\pi(kf_1 - lf_2)} \quad (14)$$

of the auto-correlation function r(kT/M,lT/M) with the (m,n)th entry $$[\hat{R}]_{m,n} = \frac{1}{MN} \sum_{k=0}^{MN-1} \sum_{l=0}^{MN-1} r\left(\frac{kT}{M}, \frac{lT}{M}\right) W_{MN}^{km} W_{MN}^{-ln} \quad (15)$$

of the correlation matrix $\hat{R}$, and notice that the (m,n)th entry is just the double Fourier transform of the windowed auto-correlation function r(kT/M,lT/M) scaled by 1/MN and sampled at $(f_1,f_2)=(m/MN,n/MN)$. Thus, after a proper scaling, the sample taken from the double Fourier transform may accurately approximates to the (m,n)th entry for sufficiently large N. The following lemma provides an important property of the double Fourier transform of the auto-correlation function r(kT/M,lT/M), which motivates the approximation to reduce the complexity. Suppose that a function r[k,l] satisfies r[k,l]=r[k+M,l+M], $\forall k,l \in \mathbb{Z}$. Then, its discrete-time double Fourier transform consists of impulse fences on the lines $f_2=f_2-m/M$, for $m \in \mathbb{Z}$. Since v(nT/M)$_n$ is WSCS with period M, the discrete-time double Fourier transform of r(kT/M,lT/M) is zero at $(f_1,f_2)=(m/MN,n/MN)$ unless m/MN−n/MN=k/M for some k. Motivated by this property, an approximation $\hat{\Omega}$ of $\hat{R}$ can be determined as $$\hat{\Omega} \triangleq \hat{R} \odot (1_{M \times M} \otimes I_N) \quad (16)$$

where $\odot$, $1_{M \times M}$, $\otimes$ and $I_N$ denote the Hadamard product, the M×M all-one matrix, the Kronecker product and the N×N identity matrix, respectively. In other words, the (m,n)th entry of $\hat{\Omega}$ is $[\hat{\Omega}]_{m,n}=[\hat{R}]_{m,n}$ for m−n=kN, and $[\hat{\Omega}]_{m,n}=0$ elsewhere, by replacing every entry of $\hat{R}$ with zero except the diagonal entries and those parallel to the diagonal with spacing an integer multiple of N. Based on this approximation, the frequency-domain equalization matrix $\Gamma$ given by $$\Gamma = \sigma_b^2 \overline{H}^H (\sigma_b^2 \overline{H}\overline{H}^H + \hat{\Omega})^{-1}. \quad (17)$$

The equalizer 404 multiplies $\Gamma$ to $\hat{z}$. By definition (16), the MN×MN matrix $\hat{\Omega}$ is a block matrix with N×N diagonal matrix blocks. Thus, the first term $\sigma_b^2 \overline{H}\overline{H}^H$ and the second term $\hat{\Omega}$ involved in the matrix inversion in (17) have the same and very special structure. The inverse of such a block matrix with diagonal matrix blocks is also a block matrix with diagonal matrix blocks and that the inverse can be obtained easily. In general, the (n,n)th entries of the N×N blocks of the inverse matrix are obtained by inverting the M×M matrix consisting of the (n,n)th entries of the N×N blocks of the original matrix. Since there are N inversions of M×M matrices, $O(M^pN)$ multiplications are required with p>2. Recall that the matrix inversions needed to compute F and G have complexity $O(M^pN^p)$.

In addition to the above complexity reduction, the complexity in multiplying the equalization matrix to $\hat{z}$ is further reduced. Since the inverse $(\sigma_b^2\overline{HH}^H+\hat{\Omega})^{-1}$ in (17) is a block matrix with N×N diagonal blocks, the equalization matrix $\Gamma$ also consists of N×N diagonal matrices. Thus, only MN multiplications are required in pre-multiplying $\Gamma$ to $\hat{z}$. On the contrary, the LMMSE TDE and FDE require $MN^2$ multiplications in pre-multiplying the equalization matrix to the observation vector, since the equalization matrices F and G are dense matrices in general.

The extra complexity incurred in the frequency-domain equalizations comes from the DFT and the IDFT operations. However, the complexity of an FFT algorithm to perform the DFT and the IDFT is in O(MN log MN). Thus, the complexity of the FDE using $\Gamma$ is dominated by that of the FFT algorithm. Moreover, the over-sampling factor M is usually slightly bigger than unity and much smaller than the block length N. Therefore, the complexity of the FDE using $\Gamma$ becomes much less than those of the LMMSE TDE and FDE, and becomes almost the same as that of the LMMSE FDE designed in the absence of CCI.

After the equalizer 404 multiplies $\Gamma$ to $\hat{z}$, the time domain converter 405 performs IDFT to the product $\Gamma\hat{z}$ for generating an estimate of data vector. Then the detector 406 determines the transmit signal.

Let $\hat{\epsilon}^{(N)}$ be the resultant average MSE when the equalization matrix $\Gamma$ is used. Then, by using the theory of the asymptotically equivalent sequences of matrices, it can be proved that $$lim_{N\to\infty}\epsilon^{(N)}=lim_{N\to\infty}\hat{\epsilon}^{(N)}, \quad (18)$$

so that the performance loss vanishes as the block length N tends to infinity.

Also, it can be shown that the FDE using the equalization matrix $\Gamma$ is more numerically stable than LMMSE TDE and FDE. When the signal correlation matrix may have a high condition number, the LMMSE TDE and FDE may suffer from a numerical stability problem as well as high computational complexity in inverting the matrix. Suppose that A is an N×N positive definite matrix and B is an N×N Hermitian positive semidefinite matrix with $I_N\odot(B\otimes I_{N_-})=I_{N_-}$. Then, $\kappa(A\odot B)\leq\kappa(A)$, where $\kappa(\cdot)$ denotes the condition number. Note that $1_{M\times M}\otimes I_N$ is Hermitian positive semidefinite and satisfies $I_{MN}\odot(1_{M\times M}\otimes I_N)=I_{MN}$ and $\overline{HH}^H\odot(1_{M\times M}\otimes I_N)=\overline{H}\overline{H}^H$. Thus, by the identity $(\sigma_b^2\overline{HH}^H+\hat{\Omega})=(\sigma_b^2\overline{H}\overline{H}^H+\hat{R})\odot(1_{M\times M}\otimes I_N)$, we have $\kappa(\sigma_b^2\overline{HH}^H+\hat{\Omega})\leq\kappa(\sigma_b^2\overline{H}\overline{H}^H+\hat{R})$. Therefore, the equalizer using the equalization matrix $\Gamma$ is more numerically stable than LMMSE TDE and FDE.

Figure 5:
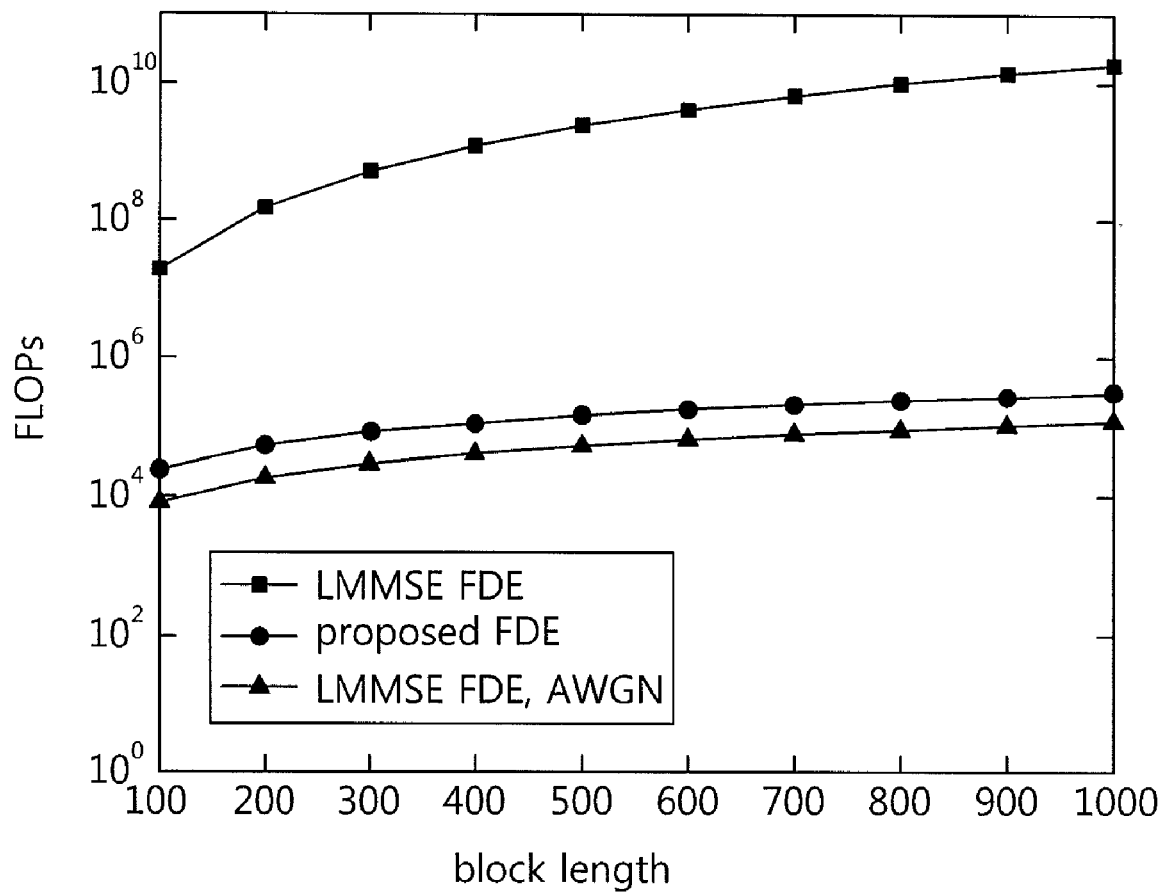
FIG. 5 shows the number of FLOPs needed for the equalization of a single block.
Figure 6:
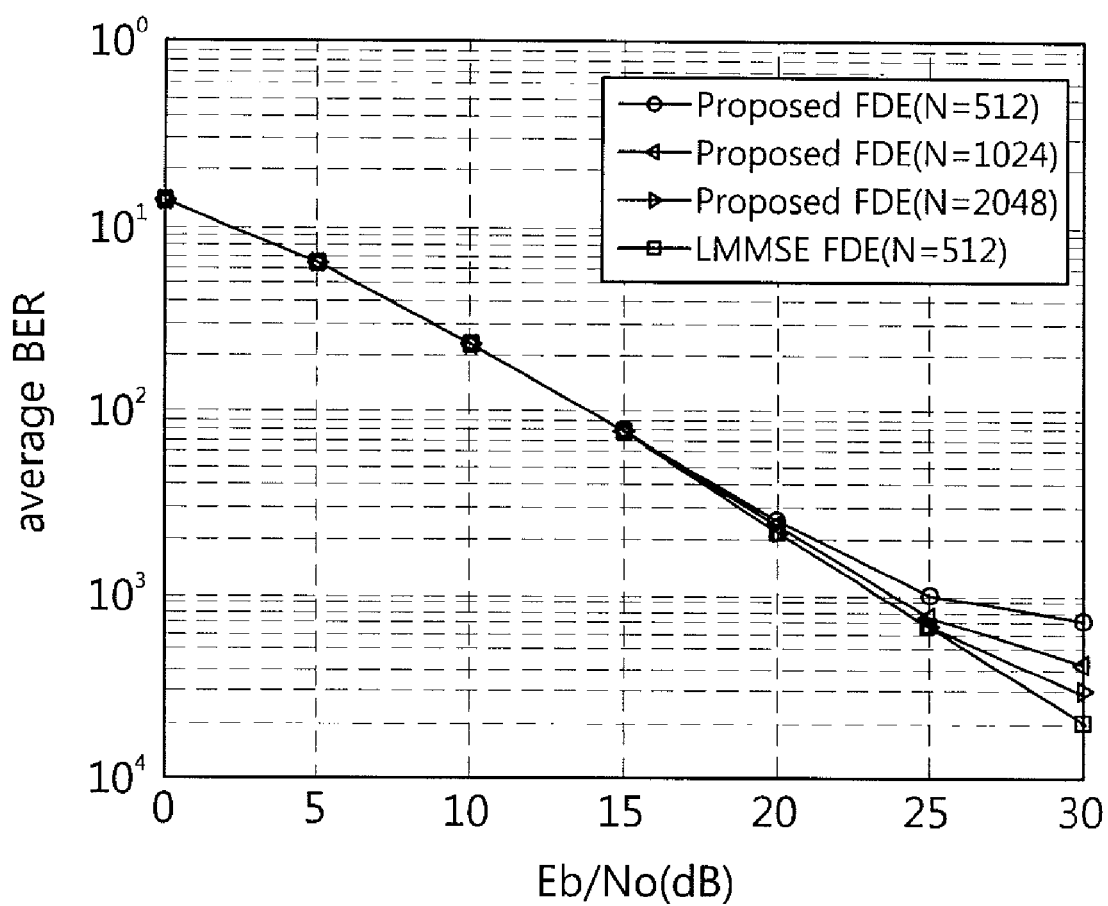
FIG. 6 shows average BER versus Eb/N0 for various block lengths.
Figure 7:
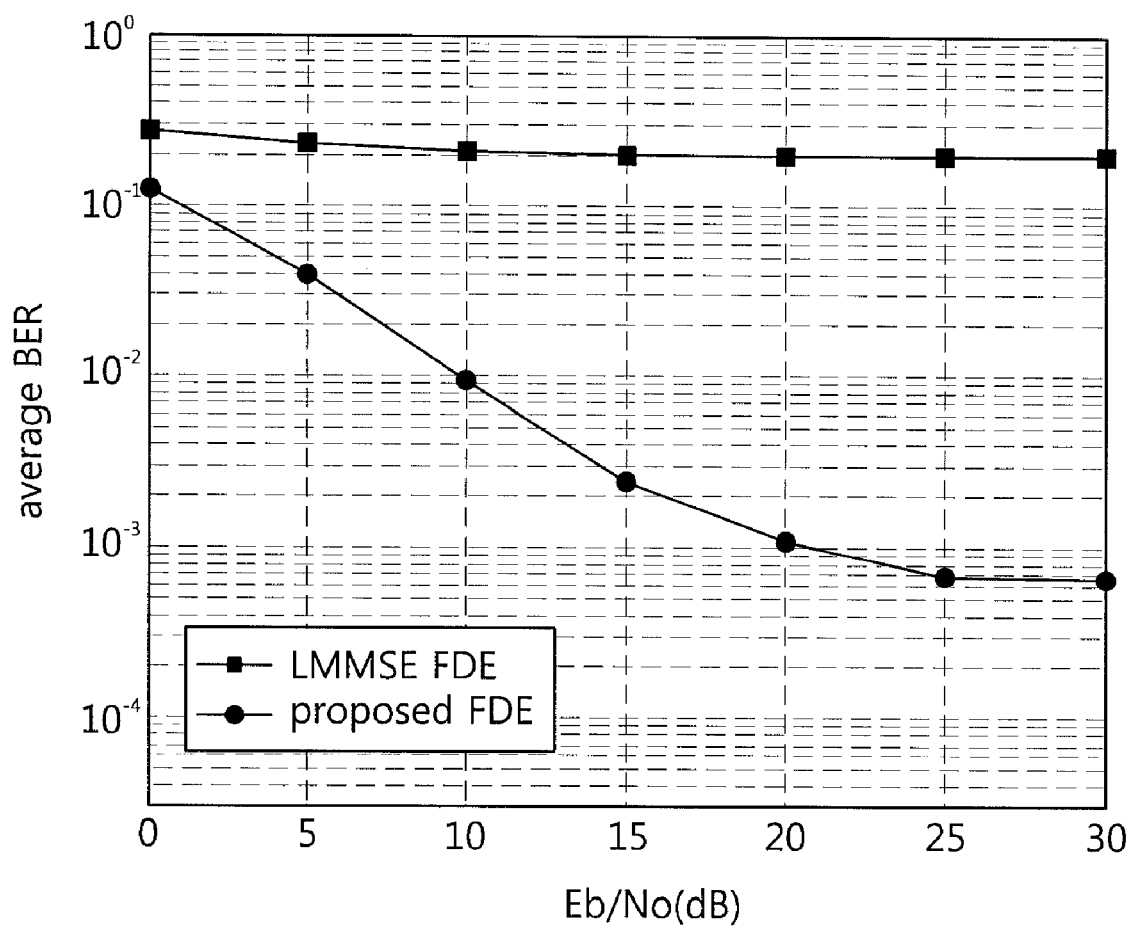
FIG. 7 shows average BER versus Eb/N0 when the receive filter is matched to the transmit pulse.

FIG. 5, FIG. 6, and FIG. 7 compares the performance of the LMMSE FDE and FDE using $\Gamma$. A data block consists of Gray-coded QPSK symbols, and a square-root raised cosine pulse with roll-off factor $\alpha\in(0,1)$ is employed as a transmit pulse, which is truncated to [−18T,18T]. We generate a five-ray random multipath channel with impulse response $$\sum_{k=0}^{4}a_k\delta(t-b_k),$$

where $b_{k's}$ are independent and identically distributed (i.i.d.) uniform random variables on [0,15T], and the tap weight coefficients $\alpha_{k's}$ are independent complex Gaussian random variables with variances decaying exponentially as $\mathbb{E}\{|a_k|^2\}=e^{-b_k/3T}$. Then, the channel is normalized so that the channel-filtered transmit pulse has unit energy.

The data-like CCI is a linearly modulated signal. It employs the same transmit pulse and the symbol period as the desired signal. The channel is generated and normalized in the same way as that of the desired signal. At the Rx, we employ either of two receive filters. For the symbol-rate equalization, i.e., M=1, the matched filter matched to the transmit pulse is employed. For the fractionally-spaced equalization, we only consider M=2 because $\alpha\in(0,1)$. In this case, the ideal low pass filter with bandwidth 1/T is employed, unless otherwise specified. The MSE and the BER are averaged over 2000 random channels. The results are obtained for various roll-off factor $\alpha$, bit energy per noise density $E_b/N_0$, and desired-to interference-signal power ratio S/I. It is assumed that the channel of the desired signal and the CCI plus noise correlation matrix are known to the Rx.

FIG. 5 shows the number of floating-point operations (FLOPs) needed for the equalization of a single block. It can be seen that the number of FLOPs of the FDE using $\Gamma$ is almost the same as that of the LMMSE FDE designed in the absence of CCI, and that it is much less than those of the LMMSE FDE.

FIG. 6 shows the average BER versus Eb/N0 for various block lengths. As the block length increases, the average BER approaches to that of the LMMSE FDE.

Up to this point, we assumed that the impulse response of the receive filter is a square-root Nyquist pulse for the over-sampling rate M/T, so that the Gaussian noise component has been white after the sampling. Now, suppose that there is no such constraint on the receive filter, so that the Gaussian noise component is colored. This includes the case where the receive filter is no longer a wide-band square-root Nyquist filter for the over-sampling rate but a matched filter matched to the transmit pulse. In this case, the signal correlation matrix may have a high condition number and, consequently, the LMMSE TDE and FDE may suffer from a numerical stability problem as well as high computational complexity in inverting the matrix.

FIG. 7 shows the average BER performance of the LMMSE FDE and the FDE using $\Gamma$, when N=128, $\alpha$=0.8 and S/I=10 dB. For M=2, when the receive filter is matched to the transmit pulse. It can be seen that the LMMSE FDE suffers from a numerical stability problem. On the contrary, the FDE using $\Gamma$ for M=2 achieves a better numerical stability.

All the functions described above may be performed by a processor such as a microprocessor, controller, microcontroller, application specific integrated circuit (ASIC), and the like operated based on software, a program code, or the like coded to perform the functions. A design, development, and implementation of the code will be apparent to those skilled in the art based on the description of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of frequency domain equalization in communication systems, the method comprising:
   receiving a transmit signal over a channel;
   generating a vector by sampling and converting the transmit signal to a frequency domain signal;
   generating an equalized vector by multiplying an equalization matrix to the sampled vector;
   generating an estimate of data vector by inverse converting the equalized vector; and
   recovering data included in the transmit signal based on the estimate of data vector,
   wherein the equalization matrix $\hat{\Omega}$ is generated based on a frequency domain correlation matrix $\hat{R}$ of CCI (co-channel interference) plus noise,
   wherein the equalization matrix $\hat{\Omega}$ is an MN×MN matrix defined as $\hat{\Omega} \triangleq \hat{R} \odot (1_{M \times M} \otimes I_N)$, where the integer M>1, the integer N>1, $1_{M \times M}$ is an M×M all-one matrix, and $I_N$ is an N×N diagonal matrix.

2. The method of claim 1,
   wherein the discrete Fourier transform is applied for conversion and the inverse discrete Fourier transform is applied for inverse conversion.

3. An apparatus of frequency domain equalization, the apparatus comprising:
   a communication interface for receiving a transmit signal over a channel;
   a converter for sampling the received transmit signal and generating a vector by converting the transmit signal;
   an equalizer for generating an equalization matrix by approximating a frequency domain correlation matrix, and generating an equalized vector by multiplying the equalization matrix to the sampled vector;
   an inverse converter for generating an estimate of data vector by inverse converting the equalized vector; and
   a detector for recovering data included in the transmit signal based on the estimate of data vector,
   wherein the equalization matrix $\hat{\Omega}$ is generated based on a frequency domain correlation matrix $\hat{R}$ of CCI (co-channel interference) plus noise,
   wherein the equalization matrix $\hat{\Omega}$ is an MN×MN matrix defined as $\hat{\Omega} \triangleq \hat{R} \odot (1_{M \times M} \otimes I_N)$, where the integer M>1, the integer N>1, $1_{M \times M}$ is an M×M all-one matrix, and $I_N$ is an N×N diagonal matrix.

4. The apparatus of claim 3,
   wherein discrete Fourier transformation is applied for conversion and inverse discrete Fourier transformation is applied for inverse conversion.

* * * * *